(12) United States Patent
Kormann

(10) Patent No.: US 7,540,129 B2
(45) Date of Patent: Jun. 2, 2009

(54) ADJUSTMENT ASSEMBLY FOR A HARVESTING MACHINE

(75) Inventor: Georg Kormann, Zweibrücken (DE)

(73) Assignee: Deere & Company, Moline, IL (US)

( * ) Notice: Subject to any disclaimer, the term of this patent is extended or adjusted under 35 U.S.C. 154(b) by 526 days.

(21) Appl. No.: 11/199,462

(22) Filed: Aug. 8, 2005

(65) Prior Publication Data

US 2006/0026939 A1  Feb. 9, 2006

(30) Foreign Application Priority Data

Aug. 7, 2004 (DE) .................. 10 2004 038 404

(51) Int. Cl.
A01D 41/14 (2006.01)

(52) U.S. Cl. .................. 56/10.2 E; 56/10.2 R; 460/1

(58) Field of Classification Search .............. 46/10.2 A, 46/10.2 D, 10.2 E, 10.2 R; 460/1, 4, 5, 6, 460/7

See application file for complete search history.

(56) References Cited

U.S. PATENT DOCUMENTS

| | | | | |
|---|---|---|---|---|
| 3,442,068 | A * | 5/1969 | Bulin | 460/6 |
| 3,906,710 | A | 9/1975 | Pask | |
| 4,160,355 | A * | 7/1979 | Blake et al. | 56/98 |
| 4,376,298 | A * | 3/1983 | Sokol et al. | 701/34 |
| 5,092,819 | A * | 3/1992 | Schroeder et al. | 460/7 |
| 5,199,248 | A * | 4/1993 | Hale et al. | 56/10.2 E |
| 5,299,413 | A | 4/1994 | Gale | |
| 5,666,793 | A * | 9/1997 | Bottinger | 56/10.2 R |
| 6,192,664 | B1 * | 2/2001 | Missotten et al. | 56/10.2 R |
| 6,205,384 | B1 * | 3/2001 | Diekhans | 701/50 |
| 6,272,819 | B1 * | 8/2001 | Wendte et al. | 56/11.9 |
| 6,421,990 | B1 * | 7/2002 | Ohlemeyer et al. | 56/10.2 R |
| 6,449,932 | B1 * | 9/2002 | Cooper et al. | 56/10.2 R |
| 6,584,755 | B2 * | 7/2003 | Holtkotte | 56/10.2 B |

FOREIGN PATENT DOCUMENTS

| | | |
|---|---|---|
| DE | 24 11 153 | 9/1975 |
| DE | 196 23 754 | 12/1997 |
| DE | 199 22 867 | 5/1999 |
| DE | 102 25 098 | 6/2002 |
| EP | 0 732 740 | 3/1996 |
| EP | 0 812 530 | 12/1997 |
| EP | 1 053 671 | 11/2000 |
| WO | WO 92/06582 | 4/1992 |
| WO | WO 03/029792 | 9/2002 |

OTHER PUBLICATIONS

European Search Report, Jun. 2, 2008, 6 Pages.
Protein Mapping Spring Wheat using A Mobile Near-Infrared Sensor And Terrain Modeling, by Corey Grant Meier, Apr. 2004, 89 Pages.
German Search Report, Dec. 8, 2006, 4 Pages.

* cited by examiner

Primary Examiner—Alicia M Torres

(57) ABSTRACT

An arrangement for the automatic adjustment of the cut height of a front harvesting attachment on a harvesting machine for the harvesting of stalk-like plants. A controller is connected to a sensor and to an actuator that can adjust the cut height of the front harvesting attachment based on the detection by the sensor of at least one characteristic of the harvested crop material and can be repositioned as a function of the signal of the sensor.

3 Claims, 2 Drawing Sheets

ADJUSTMENT ASSEMBLY FOR A HARVESTING MACHINE

BACKGROUND

1. Field of the Invention

The invention concerns an arrangement for the automatic adjustment of the height of cut of a front harvesting attachment on a harvesting machine for the harvest of stalk-like plants.

2. Related Technology

Forage harvesters are used primarily for the harvest of grass, corn or other forage plants. While pick-ups that are guided at a constant height above the ground by touch contact are used in harvesting of grass, the use of corn heads or cutter heads is common practice as the front harvesting attachment for forage harvesters in the harvesting of corn or the whole plant silage of cereal crops. The height of cut of such front harvesting attachments for the cutting of stalk-like crops can be varied.

In the state of the art, the height of cut is provided as an input by the operator of the forage harvester and is controlled automatically by the control arrangement with the use of sensors and actuators. In such a way, a predetermined height of cut or a predetermined contact pressure of the front harvesting attachment is maintained. In the case of the input of the height of cut contradictory interests must be considered. On the one hand, the cut height of the front attachment of a forage harvester has a considerable effect upon the yield per unit area and the length of the remaining stubble on the field. On the other hand, it also affects the quality of the mass of forage produced where a low cut height is less desirable in the light of the optimization of the quality. Ground particles, such as sand particles, adhering to stalks (for example, stalks of corn plants) can considerably increase the wear of cutting tools on front harvesting attachments and of following machine components such as chopper arrangements. Due to cost considerations, it may not be in the interests of the operators of such forage harvesters to utilize the lowest cut height. On the other hand, plowless farming (in connection with direct sowing) is gaining considerable significance. This, in turn, demands the least possible length of stubble and, hence, the lowest cut height. Thus, the operator of the forage harvester is confronted by the problem of finding the optimum cut height associated with the immediate case.

Moreover, the harvest of high food energy silage, that is, corn with a high proportion of corn ears, the harvested crop must be cut at a relatively great height above the ground. Here, the operator must see to it that the plants are cut as close as possible underneath the corn ears themselves. A manual re-adjustment of the cut height does not, as a rule, lead to optimum results over large time intervals.

DE 102 25 098 A proposes that the cut height used in each case be detected by measurement technology and to log the cut height with a geographical reference. This, however, does not assist the operator in the selection of the appropriate cut height.

It has also been proposed that the content of various constituents, particularly the nitrogen and protein content, of a cereal crop be determined by an analysis of the crop made by means of an appropriate sensor during the harvest of the cereal crop with a combine. As a result of the analysis, the cereal crop is loaded into differing containers. EP 0 732 740 A, WO 03/029792 A and "Protein Mapping of Spring Wheat using a Mobil Near Infrared Sensor and Terrain Modeling", Corey Grant Meier, M. Sc. Thesis, Montana State University, Bozeman, Mont., USA, April 1004, all relate to this concept.

Also, an analysis of the crop material on board a forage harvester to determine the content of certain constituents is described in DE 199 22 867 A. In this reference, the results of the analysis are merely mapped.

The problem underlying the invention is seen as the need to simplify for an operator of a forage harvester the adjustment of the cut height.

SUMMARY

The invention proposes that the cut height of the front harvesting attachment be controlled automatically as a function of a measured characteristic of the plants being harvested. The characteristic is detected by means of an appropriate sensor (for example, an optical sensor that preferably operates in the near infrared region in reflection or transmission mode) arranged at any desired location in the material flow. The characteristic of the plants detected by the sensor may be an amount of a one or more constituents of the plant material such as the contents of protein, nitrogen or energy, or a magnitude of contaminants (for example, earth or sand) in the plant material could be sensed. In the latter instance, it becomes possible to reduce the amount of contaminants in the harvested forage and thereby to increase the quality. Simultaneously, the work load on the operator is reduced and an inexperienced operator can deliver a good operating outcome.

Various strategies or target inputs may be programmed into the controller connected to the adjustment assembly, according to which it controls adjustment as a function of the signals of the sensor. One or more value inputs may be provided as permanent input or may be selected by the operator. One possible target value input could be to hold the proportion of contaminants in the forage to a minimum value. If this target value input is selected, the height of cut is raised until contaminants are limited to a defined threshold value (that is a level of permanent input or an input that can be selected) or no contaminants exist in the harvested plants. Another possible target value input could be a maximum proportion of fiber attained in the forage. In this instance the controller would lower the height of cut as far as possible based on the target value. In this case, a combination could be selected for the target value input with respect to the contaminants, that is, the height of cut is lowered until a defined limit value, or one that can be provided as input, is reached for the contaminants contained in the forage. Another possible target value input could be the maximum food energy content of the forage, where the energy content can be provided as an input by the operator or be pre-defined. Thereby certain qualities of the forage can be attained automatically. Other target value inputs can also be combined in any manner desired.

BRIEF DESCRIPTION OF THE DRAWINGS

Further features and advantages of the invention will become readily apparent to persons skilled in the art after a review of the following detailed description of a preferred embodiment, with reference to the appended drawings, which shows.

DETAILED DESCRIPTION

Figure 1:
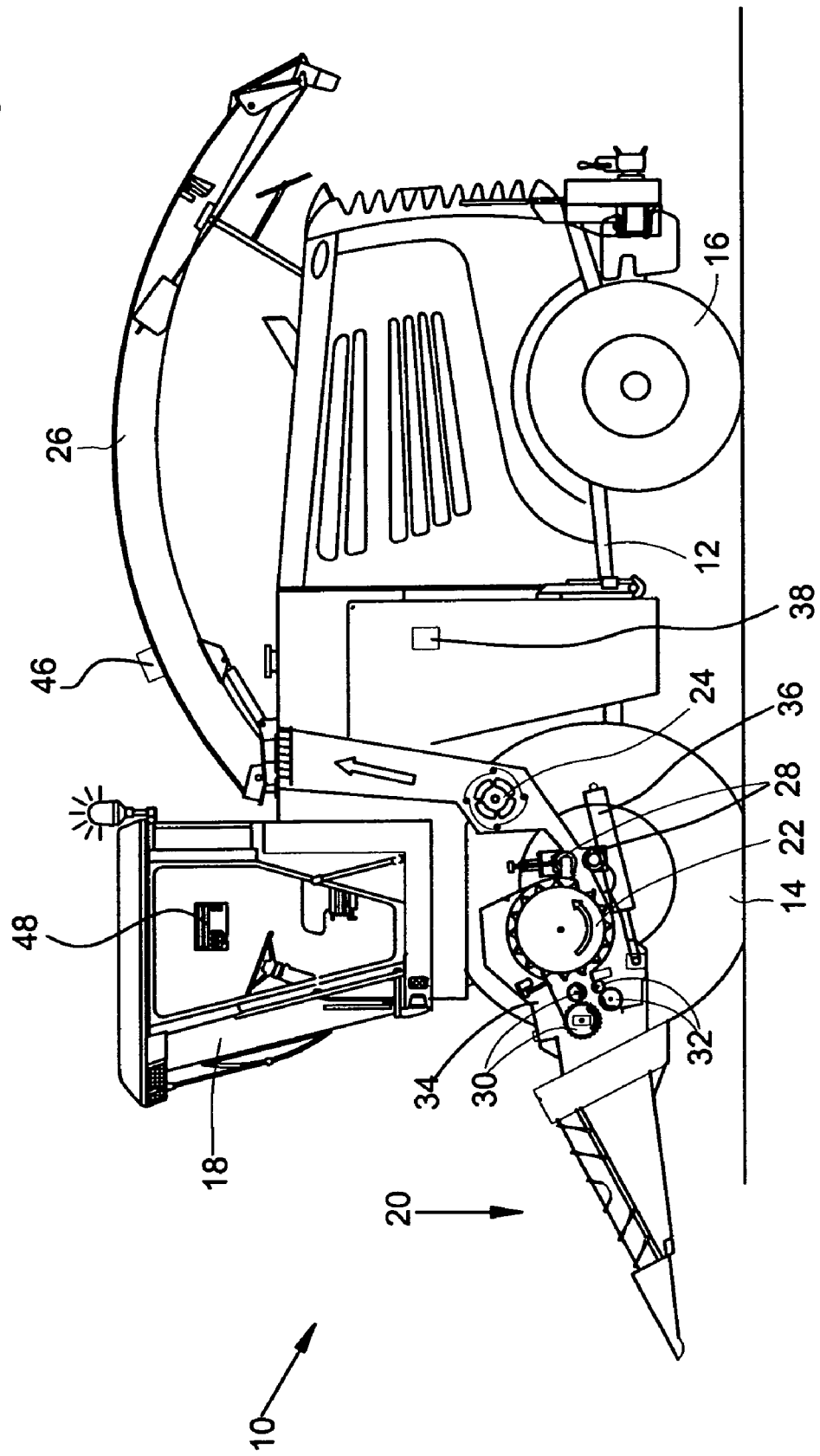
FIG. 1 shows a schematic side view of a harvesting machine with an arrangement for the adjustment of the cut height of a front harvesting attachment.

A harvesting machine 10, shown in FIG. 1 in the form of a self-propelled forage harvester, is supported by a frame 12 that is carried by driven front wheels 14 and steerable rear wheels 16. The harvesting machine 10 is controlled from an operator's cab 18 from which a front harvesting attachment 10, appropriate for harvesting stalk-like plants, can be controlled visually. In the shown embodiment, the front harvesting attachment 20 is a corn picker head operating independently of rows. It conducts crop taken up from the ground (for example, corn, cereal crop or the like) to a chopper drum 22, by means of upper pre-pressing rolls 30 and lower pre-pressing rolls 32, where it is chopped into small pieces and delivered to a conveyor arrangement 24. The crop leaves the harvesting machine 10 to an accompanying trailer (not shown) over a discharge arrangement 26 whose position can be adjusted. A post-chopper reduction arrangement 28 is located between the chopper drum 22 and the conveyor arrangement 24, and through which the crop to be conveyed is conducted tangentially to the conveyor arrangement 24. The invention can also be applied to other harvesting machines that process stalk-like crops, for example com balers.

The front harvesting attachment 20 and the intake housing 34 of the harvesting machine 10 that carries it, in which the pre-pressing rolls 30 and 32 are also arranged, are supported in bearings free to pivot about the axis of rotation of the chopper drum 22. The pivoting of the front harvesting attachment 20 about this axis of rotation is performed by an actuator 36 in the form of a hydraulic cylinder. The pivoting of the front harvesting attachment 20 also provides for the adjustment of the cut height of the front harvesting attachment 20; that is, the height at which it cuts off the plants from the stubble remaining in the ground. The hydraulic cylinder is connected in joints at one end to the frame 12 and at the other end to the intake housing 34. Such an actuator 36 may be provided on both sides of the intake housing 34.

Figure 2:
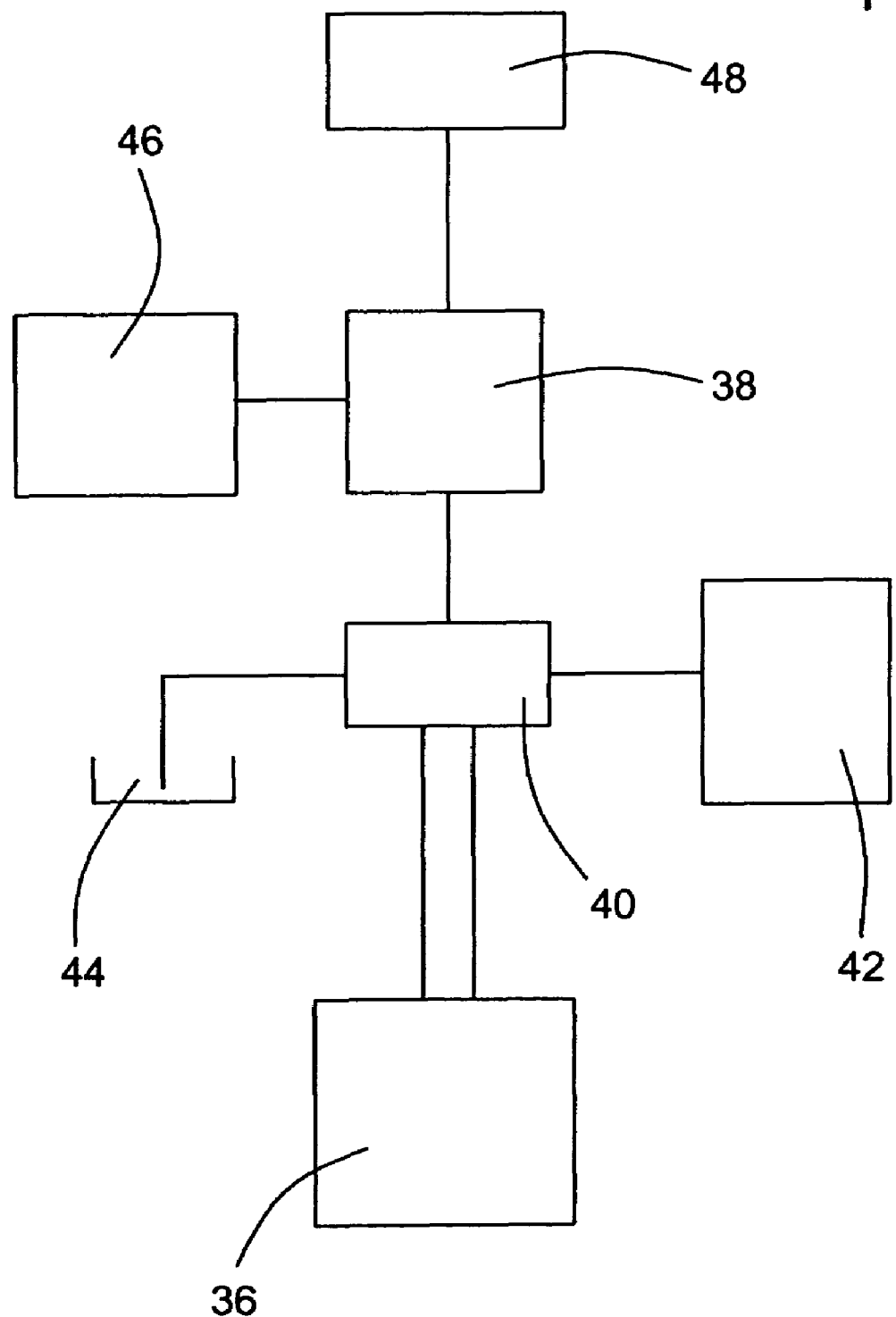
FIG. 2 shows a pattern for the adjustment of the height of cut of the front harvesting attachment.

The actuator 36 is single acting, or it may be double acting, and may be connected, so as to carry hydraulic fluid to a pump 42 or a reservoir 44 over a valve arrangement 40 (see FIG. 2). The valve arrangement 40 is controlled electromagnetically by a controller 38. The controller 38 and the elements for repositioning the actuator 36 as described here are provided as ongoing production components on harvesting machines. A feedback sensor (not shown) can transmit a signal to the controller 38 regarding the immediate position of the actuator 36 or the pivot angle or the intake housing 34 about the axis of rotation of the chopper drum 22. The controller 38 is, in particular, the machine controller that also controls other functions of the harvesting machine.

The controller 38 is connected with a sensor 46 and an input and display arrangement 48. The sensor 46 is arranged on the upper side of the discharge arrangement 26. It operates in the near infrared region and directs a broadband light on the chopped plants in the discharge arrangement 26 and resolves the light reflected by plants into spectra by means of wavelength dispersion elements (grating or the like). The reflected spectra is detected by appropriate light sensitive detectors detected in specific wavelengths. An appropriate sensor is described by U.S. Pat. No. 6,421,990, whose contents is incorporated into the present document by reference.

The sensor 46 detects several properties of the chopped plants, particularly their material contents or one more values derived therefrom. The material contents of particular interest are organic material components, such as amylum, enzyme soluble organic substances (ElosT), oil and raw protein, and the proportions of these components in the harvested crop are detected by the sensor 46. In additional, the contents of non-organic components such as mineral components (ash), for example sodium and magnesium, contaminants in the form of sand (silicon dioxide) and earth, water and the color of the plants can be measured.

Parameters of the harvested crop that are detected, in addition or alternatively to the material components, or that can be derived therefrom are the contents and the raw fiber contents of the harvested crop. The raw fiber contents and the fiber length can be determined, in particular, by further processing of the output signals of the sensor 46 by means of a program running in the controller 38.

The controller 38 has available, on the basis of the signals of the sensor 46, information and similar data regarding the protein content, the energy content and the proportion of contaminants in the chopped plants. The operator in the operator's cab 18 can read the actual magnitudes of these values at any time by means of the input and display arrangement 48. The input and display arrangement 48 makes it possible for the operator to select the height of cut of the front harvesting attachment 20, on the basis of which target value the controller 38 is to adjust. In addition, this target value can be provided as input or selected from among several inputs. During the harvesting operation, the controller 38 controls the actuator 36 on the basis of signals of the sensor 46 in such a way that the preselected target value input is maintained. Thereby a certain energy content or protein content in the forage is attained or a predetermined degree of contamination is not exceeded. By way of inputs into the input and display arrangement 48, the operator can vary the preselected target value at any time and, if useful, manually override the outputs of the controller 38 in order to raise the front harvesting attachment 20 in time to avoid a collision with an obstacle, for example. A conventional sensor for determining the height above the ground of the front harvesting attachment and/or the contact pressure of the cutter head upon the ground may also be connected to the controller 38. The controller 38 utilizes the signals of this sensor in order to prevent the front harvesting attachment 20 from being lowered too far to positions in which, for example, it could penetrate the ground.

The measurement results of the sensor 46 and the cut height at the time are geographically referenced and stored in memory by the controller 38 for later evaluation, for example, for subsequent fertilization. In this way the height of the stubble remaining on the field can be considered as plant food input in a fertilizer calculation.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

The invention claimed is:

1. A cut height adjustment assembly for a forage harvester including a chopper drum for chopping crop material into short pieces, the assembly comprising:
a harvesting unit configured to cut stalk-like crop material at a height above ground level and to feed the crop material to said chopper drum; said harvesting unit being mounted to said forage harvester for vertical adjustment among a plurality of positions respectively for achieving different cut heights;

an extensible and retractable actuator being connected between the harvesting unit and the forage harvester such that extension or retraction of said actuator causes movement of the harvesting unit relative to the forage harvester and adjusts the height above ground at which the harvesting unit cuts crop material;

a sensor being located downstream from said chopper drum and configured to detect a contaminant content contained in the crop material and to transmit an input signal based thereon;

an electronic controller having an input coupled to the sensor and having an output coupled to the actuator;

a manually operable input device couoled to said controller and being operable for inputting at least one target value representing the maximum contaminant content that can be tolerated, with said controller operating to cause said actuator to maintain the height of cut no lower than that at which said maximum content is sensed by said sensor, whereby the cut height of the harvesting unit is automatically adjusted.

2. The assembly according to claim 1 wherein the sensor is an optical sensor.

3. The assembly according to claim 2 wherein the sensor is a near infrared sensor.

* * * * *